United States Patent [19]

Schad et al.

[11] Patent Number: 4,808,101

[45] Date of Patent: * Feb. 28, 1989

[54] TRI-INJECTION OF HOLLOW ARTICLES

[75] Inventors: Robert D. Schad, Toronto; Paul P. Brown, Orangeville, both of Canada

[73] Assignee: Husky Injection Molding Systems Ltd., Bolton, Canada

[*] Notice: The portion of the term of this patent subsequent to Jan. 5, 2005 has been disclaimed.

[21] Appl. No.: 50,680

[22] Filed: May 18, 1987

Related U.S. Application Data

[63] Continuation-in-part of Ser. No. 862,269, May 12, 1986, Pat. No. 4,717,324.

[51] Int. Cl.$^4$ ............................................. B29C 45/02
[52] U.S. Cl. ................................................... 425/130
[58] Field of Search .................. 425/130, 131.1, 131.5, 425/143, 144, 542, 547, 548, 549, 557, 559, 560, 562, 573, 588, 522; 264/40.6, 328.4, 328.8, 328.14, 328.15, 328.16, 255, 45.1

[56] References Cited

U.S. PATENT DOCUMENTS

| 4,030,637 | 6/1977 | Boden et al. | 425/130 |
| 4,518,344 | 5/1985 | Latreille et al. | 425/572 |
| 4,717,324 | 1/1988 | Schad et al. | 425/562 |

FOREIGN PATENT DOCUMENTS 212926 12/1983 Japan ................................. 425/588

Primary Examiner—Jay H. Woo
Assistant Examiner—Timothy W. Heitbrink
Attorney, Agent, or Firm—Bachman & LaPointe

[57] ABSTRACT

Apparatus for tri-injecting a plurality of thermoplastic materials to mold an article having a layered wall structure using thermoplastic materials having different optimum processing temperatures including the maintenance of the optimum temperatures in flow paths individual to each material from its source at least to the injection nozzle.

8 Claims, 2 Drawing Sheets

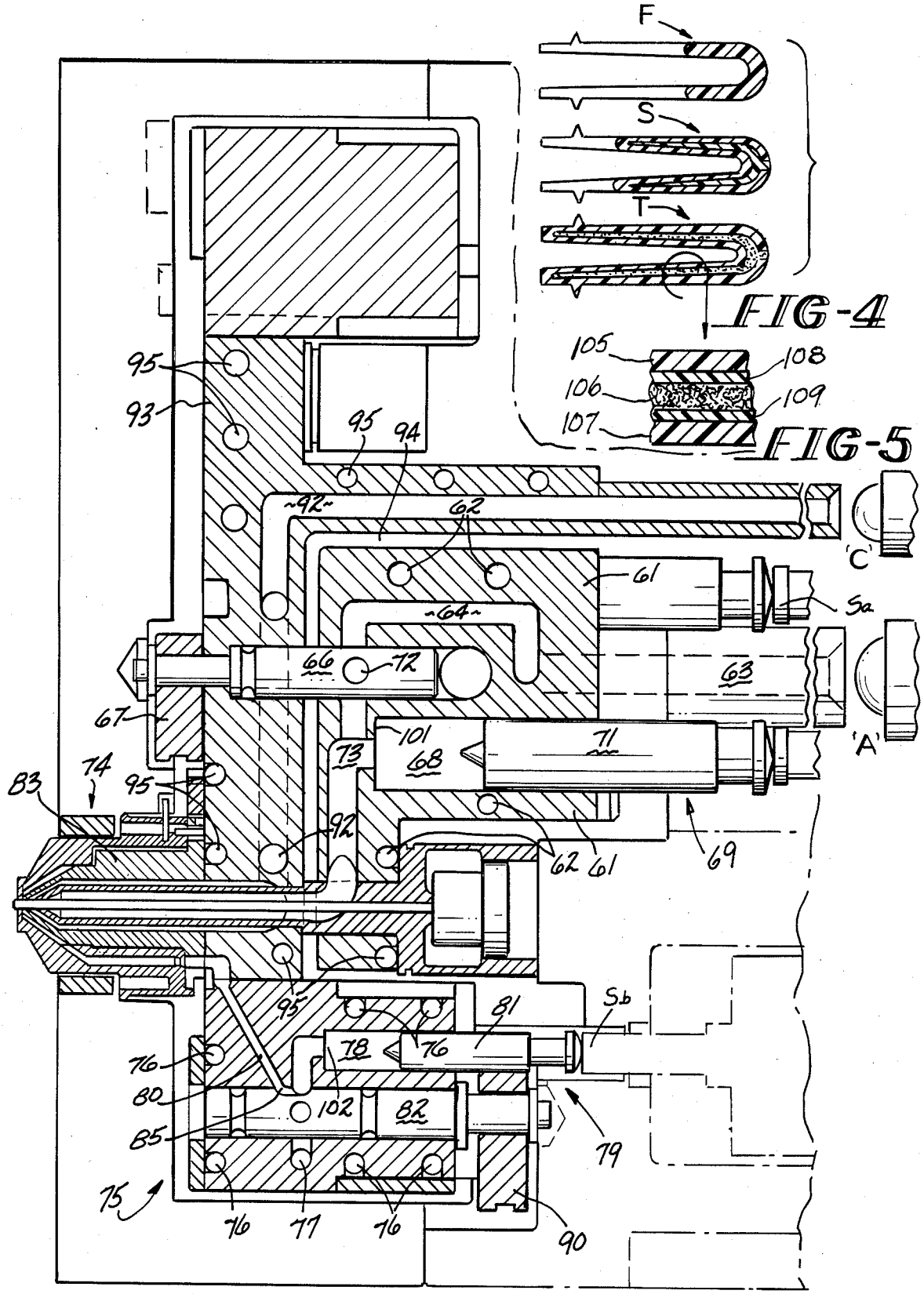

TRI-INJECTION OF HOLLOW ARTICLES

CROSS-REFERENCE TO RELATED APPLICATIONS

This application is a continuation-in-part of copending U.S. patent application Ser. No. 862,269, for Coinjection of Hollow Articles and Preforms, by Robert D. Schad and Paul P. Brown, filed May 12, 1986 now U.S. Pat. No. 4,717,324, issued Jan. 5, 1988.

FIELD OF INVENTION

The present invention relates to tri-injection of resins and relates in particular to an improved method and apparatus for molding hollow plastic articles to provide preforms having a layered wall structure where the starting materials can if desired have substantially different optimum processing temperatures.

BACKGROUND OF THE INVENTION

The simultaneous or sequential injection (coinjection) of two or more resins into a mold cavity to develop layered wall structures is well known as evidenced by the disclosures of U.S. Pat. Nos. 4,497,621, 4,518,344, 4,525,134, 4,526,821, 4,609,516 and 4,657,496.

These disclosures, while providing separate flow paths for the respective resins, do not show or suggest a method for maintaining each resin at its optimum processing temperature during transit from an extruder or other source to the mold cavity.

The maintenance of processing temperatures of each individual resin is especially important when the optimum processing temperature of one resin causes degradation of a second resin or vice versa.

For example, it is frequently desirable to mold a layered wall structure for a hollow article or a preform where coinjection materials include ethylene vinyl alcohol copolymer (EVOH) which process most satisfactorily at temperatures ranging from 400° to 440° F. and polyethylene terephthalate (PET) which processes best at temperatures ranging from 500° to 550°F. As stated previously, failure to maintain these optimum temperatures individually leads to degradation of one resin or the other resulting in defective product.

In prior art machines and processes numerous procedures have been devised to minimize the deleterious effect arising from resins having wide ranging and different processing temperatures.

Some procedures involve attempting to process the resins very quickly minimizing residence time and thus minimizing degradation.

Other procedures involve the use of resins that process at generally the same temperature range. Obviously, such a procedure limits the choice of resins and precludes their selection based upon desired barrier or other physical properties.

While the above coinjection methods and procedures are operable, it is highly desirable to enhance commercial success to provide coinjection molding machines and processes in which there is complete freedom to choose resin materials on the basis of their barrier characteristics even though the chosen resins process at different temperatures.

A particular complication arises if three or more resins are utilized, each from separate sources, especially where each should be maintained at separate temperatures.

The aforesaid copending U.S. patent application Ser. No. 862,269 contemplates the coinjection of two or more resins; however, it is desirable to provide an improved process and apparatus for the tri-injection of three or more resins accommodating the complexities of such a system where each resin should be maintained at separate temperatures.

SUMMARY OF THE INVENTION

Consequently, it is a prime feature of the present invention to provide a process and apparatus for the tri-injection of plastic articles with individual hot runner systems for each resin, from the resin source to the mold cavity, maintained and controlled independently at the temperature which is optimum for processing the selected resin.

It is a further feature of the invention to provide a nozzle structure for the aforesaid process and apparatus so constructed and arranged as to provide channels individual to each resin with individual heating means for maintaining at least two of said channels at a temperature which is most satisfactory for the resin progressing through the channel.

A further feature of the present invention is to provide a tri-injection method and apparatus which lends itself ideally to molds having a large number of cavities, i.e. 16 and 32 cavity molds, for example.

A still further feature of the invention is the provision of "shooting pots" or injection cylinders individual to at least two of said resin channels.

A further feature of the invention is the provision of a spool valve or rotary valve which is mechanically actuated to control positively the loading of the shooting pots and to eliminate undesirable backflow in the hot runner systems.

A further feature of the invention is the provision of a shooting pot and a cooperating spool valve assembly for each resin channel.

The method of the present invention comprises a method of molding layers of different thermoplastic material sequentially including the steps of providing individual sources of different thermoplastic materials each properly and individually conditioned for processing, providing a mold cavity, providing a nozzle for introducing said different thermoplastic materials into said mold cavity, providing a hot runner system including conduits individual to each material leading from each source to the nozzle and from the nozzle to the mold cavity, maintaining at least two of said materials at the appropriate process temperature from its source to the mold cavity, and maintaining at least one of said materials at the appropriate process temperature from its source to the nozzle.

A tri-injection molding apparatus in accordance with the present invention comprises at least one mold cavity said cavity having a nozzle individual thereto, a hot runner system including conduit means for supplying at least three thermoplastic materials to said nozzle through individual channels, each material originating from a separate source, heating means associated with the molding apparatus for maintaining at least two of said materials at their appropriate temperature from its source through the hot runner system and through the nozzle to the mating mold cavity, and heating means associated with the apparatus for maintaining at least one of said materials at the appropriate process temperature from its source through the hot runner system to the nozzle.

In the preferred embodiment, three separate resins are employed, although of course more can be used if desired. It is a significant advantage of the present invention that each of the three resins in the preferred embodiment can be maintained at its own processing temperature. All of the resins are maintained at their own temperature from the source to the nozzle, and the nozzle maintains two of the resins at their own temperatures.

It has been found that this is eminently suitable where, for example, two of the three resins have comparable processing temperatures, as where one layer is EVOH, one layer is reground PET, and one layer is virgin PET.

However, this system is also suitable where all three resins have different processing temperatures since all resins are maintained at their own processing temperature up to the nozzle and the most critical material, or two critical materials, can be maintained at its own separate temperatures all the way to the mold.

Where additional materials are used, as a fourth or more, it or they should preferably be maintained at a separate temperature up to the nozzle.

Other features and advantages of the present invention will become more apparent from an examination of the succeeding specification when read in conjunction with the appending drawings, in which:

BRIEF DESCRIPTION OF THE DRAWINGS

FIG. 2 is a sectional view illustrating details of a hot runner-nozzle assembly individual to each mold cavity of FIG. 1, FIG. 4 is a series of sectional views of a molded article detailing the layered wall structure after the first, second, and third shots of resin, and FIG. 5 is an enlarged sectional view showing the layered wall structure after the third shot of resin.

DETAILED DESCRIPTION OF THE PREFERRED EMBODIMENT

Figure 1:
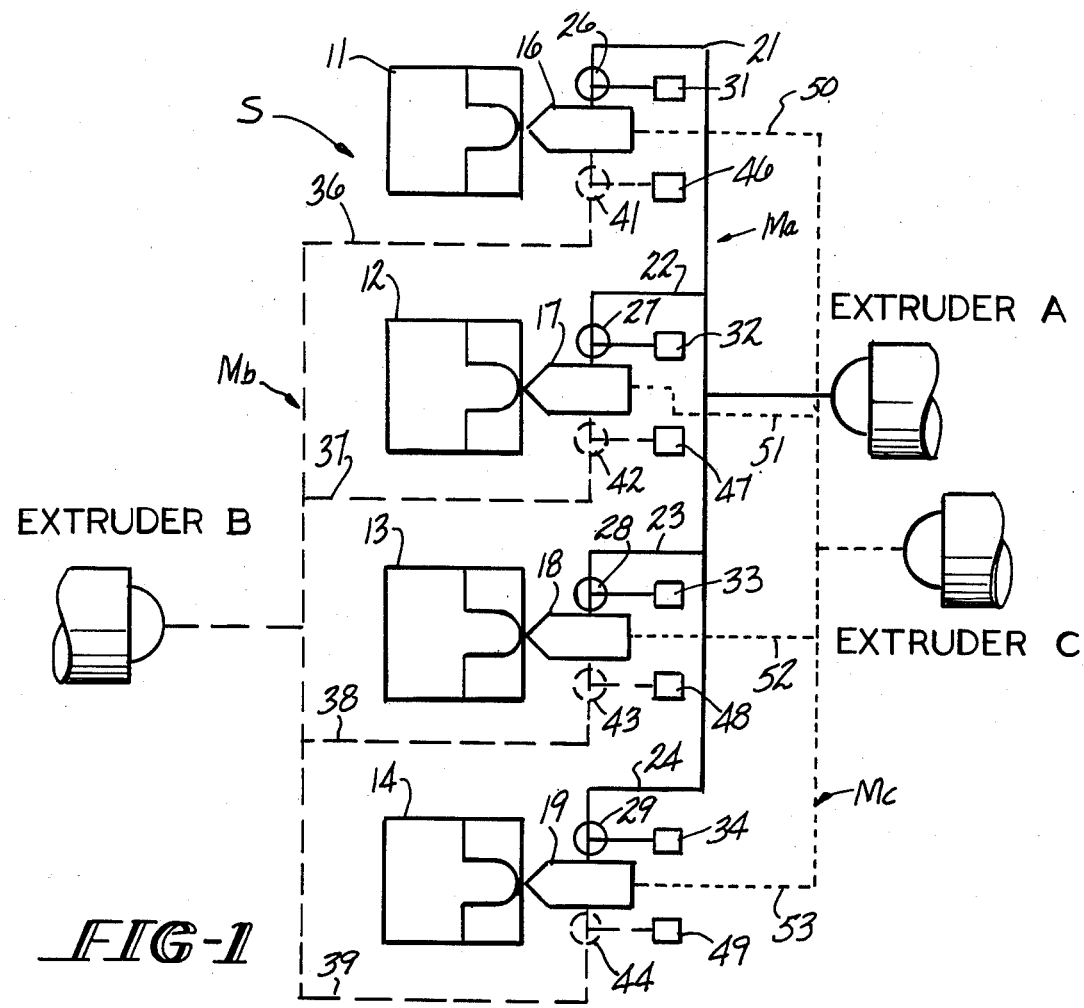
FIG. 1 is a schematic illustration of a hot runner system for a four cavity mold accommodating three thermoplastic resins wherein each can have different optimum processing temperatures and each maintained at its optimum temperature from its source to the nozzle, and two maintained at their optimum temperature in the nozzle.

Referring now in detail to the drawings, the illustration of FIG. 1 shows schematically a triple hot runner system S which accommodates three thermoplastic resins suitable for use where each has different optimum processing temperatures. One resin is provided from a source identified as extruder A, a second resin is provided from a source labeled extruder B, and a third resin is provided from a source labeled extruder C.

While the present exemplary embodiment of the invention discloses three resin sources, it is entirely within the spirit and scope of the invention to utilize more than three resin sources.

The portion of the hot runner system leading from extruder A is shown in solid lines, that portion of the system originating with extruder B is shown in dashed lines, and that portion of the system originating with extruder C is shown in dotted lines.

In the embodiment of FIG. 1, the sequence of injection is a first injection from extruder A of virgin PET to form the exterior surface of the article, a second injection from extruder B of the EVOH barrier resin, and a third injection from extruder C of the filler resin which may be reground PET or any other desired filler resins as polyethylene or polypropylene. If desired one could have a fourth injection of virgin PET to finish the gate area. Thus it can be seen that three (3) separate lines are provided, each with their own temperature control to the nozzle and two separately controlled in the nozzle. Where virgin PET and reground PET are used together with EVOH, the lack of three separate temperature control systems in the nozzle is obviously not relevant; however, it has been found that even where a completely different third material is used for the filler excellent results are obtained due to the provision of three (3) separate temperature control systems to the nozzle.

For purposes of convenient explanation of the invention, the portion of the hot runner system connected to extruder A (solid lines) for virgin PET is maintained by suitable heaters in well-known fashion at a temperature ranging from 500° to 550° F., the optimum processing temperature for a thermoplastic resin such as PET. The portion of the system connected to extruder B (dashed lines) for EVOH is maintained at a temperature ranging from 400° to 400° F., the optimum processing temperature for a thermoplastic resin such as EVOH. If the filler plastic is low density polyethylene, the portion of the system connected to extruder C is maintained at a temperature ranging from 350° to 400° F., whereas, if the filler plastic is reground PET, the portion of the system connected to extruder C is maintained at a temperature ranging from 480° to 550° F. It is to be noted that the resin selected and their optimum processing temperatures are merely exemplary of the present invention and their use in the present description is not intended to limit the invention to those specific resins described above.

Referring further to FIG. 1, the reference numerals 11, 12 and 13 and 14 designate four mold cavities each communicating with individual nozzles 16, 17, 18 and 19.

Extruder A supplies a heated manifold $M_a$ with for example virgin PET which, in turn communicates with each nozzle via hot runners or channels 21, 22, 23 and 24, respectively. The reference numerals 26, 27, 28 and 29 designate spool valves which operate to control charging of shooting pots or injection cylinders 31, 32, 33 and 34.

Correspondingly, hot manifold $M_b$ supplies for example EVOH leading from extruder B to each nozzle 16, 17, 18 and 19 via hot runners or channels 36, 37, 38 and 39. Spool valves 41, 42, 43 and 44 control charging of shooting pots 46, 47, 48 and 49. Hot manifold $M_c$, supplying for example reground PET, polyethylene, or polypropylene, leads from extruder C directly to each nozzle 16, 17, 18, 19 via hot runners 50, 51, 52 and 53. It is noted that extruder C leads directly to the nozzles without the use of shooting pots, although shooting pots could of course be used.

While the schematic of FIG. 1 shows a hot runner system leading from three sources (extruders A, B and C) transporting conditioned thermoplastic resins to a four cavity mold, it is entirely within the scope and capability of the present invention to service as many as 16 to 72 cavities with resins originating from three or more sources.

FIG. 2 is a section of the hot runner system in the immediate vicinity of any one of the four nozzle-cavity assemblies of FIG. 1, i.e. cavity 11 and nozzle 16, for example and is described in connection with an exemplificative embodiment.

A central manifold block 61 maintained at an operating temperature ranging from 500° to 550° F. for virgin PET by heating elements 62—62 receives plasticized resin from extruder A through channels 63 and 64. Spool valve or rotary valve 66, in circuit with channel 64 and operated (rotated) by link mechanism 67, controls the charging of reservoir 68 of the shooting pot or injection cylinder 69 equipped with an injection piston or charging piston 71. The spool valve 66 is formed with a transverse throughbore 72 and is shown in FIG. 2 in the closed position. The reservoir 68 communicates with channel 73 which leads to the nozzle assembly indicated generally by the reference number 74.

Heating elements 62—62 maintain the desired processing temperature of channel 73.

Heat conducted from manifold block 93 to a central portion of the nozzle assembly 74 maintains the integrity of the desired temperature range within the nozzle in a manner which will be described in more detail hereinafter.

A manifold segment 75 secured to manifold block 93 is heated by elements 76—76 to maintain optimum temperature of to 440° F. for EVOH in the hot runner connecting extruder B (not shown in FIG. 2) to channel 77 leading to the reservoir 78 of a second shooting pot 79 equipped with an injection or charging piston 81.

Here again, a spool valve 82 (shown in FIG. 2 in the closed position relative to channel 77) controls charging of the reservoir 78. In the closed position of the spool valve 82, the reservoir 78 communicates with the nozzle assembly 74 via channel 80 by virtue of cut-out 85. When the spool valve 82 is open the channel 80 is closed. Link mechanism 90 operates to rotate valve 82.

Figure 3:
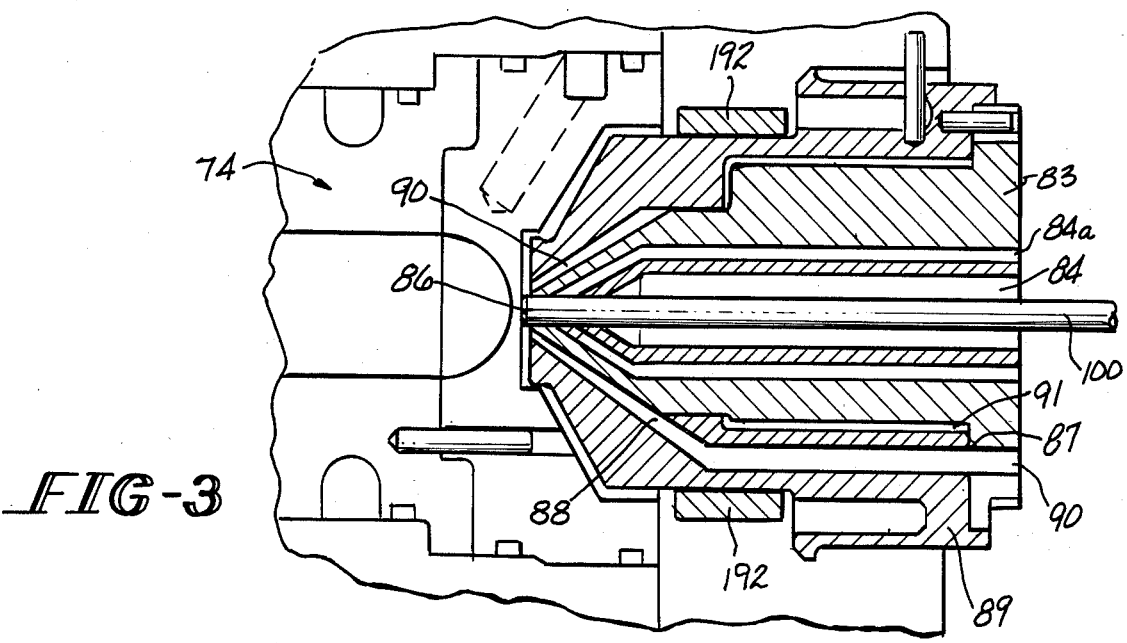
FIG. 3 is a sectional view showing details of the nozzle of FIG. 2, inverted.

Referring to FIG. 3, note that the nozzle assembly 74 includes a central spigot 83 in thermal contact with manifold block 93 immediately adjacent local heating elements 95—95 as is most apparent in FIG. 2.

The spigot 83, fabricated preferably of a good metallic thermal conductor such as beryllium copper is, formed with through channels 84 and 84a through which flow material from extruders A and C to the nozzle gate 86.

The spigot is supported by minimal bearing surfaces 87–88 in a housing 89 which is spaced from the spigot substantially throughout its length by an insulating air gap 91. This air gap blocks conduction of heat from the spigot 83 to the housing 89 to preserve maintenance of the EVOH at its optimum process temperature controlled by heating means 192 as EVOH progresses through channel 90 of the housing to gate 86.

Extruder C transfers material via channel 92 in manifold block 93 directly to nozzle channel 84a in spigot portion 83. Manifold 93 is insulated from manifold 61 by space 94 and has its temperature controlled separately therefrom by heaters 95—95. This enables independent temperature control of the resin from extruder C all the way to the nozzle.

Thus, it is apparent that the hot runner system of the present invention is effective to maintain different optimum process temperatures appropriate to two different resins from the source of the resin to a nozzle gate, and a third resin from the source of the resin to the nozzle.

OPERATION

A preferred method of operation will now be described.

To prime the hot runner system initially, extruders A and B including their cooperating shooting pots 69 and 79 are purged. Extruders A and B are moved into operative position relative to their respective manifolds. With valve stem 100 and spool valves 66 and 82 in the open position shooting pot reservoirs 68 and 78 are charged with for example virgin PET and EVOH compound, respectively.

Next valve stem 100 is closed and purged resin in the mold cavity is removed.

Thereafter the mold is closed and clamped, valve stem 100 is opened and an automatic sequence occurs as follows:

Spool valve 66 is closed and injection piston 71 is advanced until it bottoms at the point indicated by the reference numeral 101 discharging a measured amount of virgin PET into the mold cavity through channel 73 and gate 86.

This constitutes the first shot of virgin PET into the mold cavity as shown schematically at F in FIG. 4.

The piston 71 is held forward (in its bottomed position 101) blocking access to reservoir 68 to prevent backflow of virgin PET compound from channel 73 into reservoir 68.

That is, the piston 71 is held bottomed to block access to reservoir 68 because upon subsequent operation of piston 81 to inject EVOH, the EVOH injection pressure has a tendency to displace virgin PET from channel 73 back into reservoir 68.

Next spool valve 82 is closed to extruder B and opened to channel 80. Operation of injection piston 81 until it bottoms at 102 discharges a measured amount of EVOH into the cavity through channel 80 and gate 86.

This constitutes the shot of EVOH into the mold cavity (second shot or resin) to develop a three (3) layered wall as shown schematically at S in FIG. 4. The volume of the first and second shots of resin is less than the total volume of the mold cavity.

Next channel 80 is closed by appropriate rotation of spool valve 82. Next extruder C discharges a measured amount of third resin as filler via channel 92. The third resin can be scrap PET or polypropylene or other suitable material.

This step constitutes the third shot of resin to develop a five (5) layered wall as shown schematically at T in FIG. 4. Thus, a five (5) layered wall structure is molded using three (3) resins, as clearly shown in FIG. 5 wherein layers 105 and 107 are PET, layers 108 and 109 are EVOH, and layer 106 is filler.

After packing is completed valve stem 100 is moved to closed position and piston 71 is freed to move. PET extruder A is operated to recharge reservoir 68 of shooting pot 69 displacing piston 71 until it contacts an injection stop Sa (FIG. 2). The position of the stop Sa controls and measures the amount of PET introduced into the reservoir 68.

In similar fashion the injection stop Sb (FIG. 2) controls and measures the amount of EVOH introduced into the EVOH reservoir 78.

During the course of packing the mold cavity (the part) the EVOH reservoir 78 is recharged by opening spool valve 82 to allow extruder B to displace EVOH piston 81 until the piston contacts its injection stop Sb thus charging EVOH reservoir 78 with a measured amount of EVOH compound.

After a suitable cooling interval, the mold is opened and the article is ejected by known means.

The above cycle is then repeated to generate additional layered articles or performs in continuous, automatic fashion.

It is to be understood that the operation just described occurs simultaneously in all four mold cavities 11, 12, 13, and 14 of FIG. 1 or in any number of mold cavities as considerations of mold design and production requirements dictate.

It is to be understood further that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A tri-injection molding apparatus for molding articles and preforms having multi-layered walls comprising:
   at least one mold cavity, said cavity having a nozzle individual thereto,
   a hot runner system including conduit means for supplying at least three thermoplastic materials to said mold cavity, each material originating from a separate source, in which the conduit means defines separate and individual channels for each thermoplastic material from said source through separate nozzle channels to said mold cavity, heating means associated with the apparatus for maintaining at least two of said materials at their appropriate temperature from its source through the hot runner system and through the separate nozzle channels to the mating mold cavity, insulating means in said nozzle separating at least two of said nozzle channels, said insulating means being substantially co-extensive with said nozzle and being operative to block heat transfer from one nozzle channel to the other, and heating means associated with the apparatus for maintaining the third of said materials at the appropriate process temperature from its source to the nozzle.

2. The apparatus of claim 1 in which at least one of said channels communicates with a shooting pot.

3. The apparatus of claim 2 in which said at least one channel includes valve means for controlling flow to said shooting pot.

4. The apparatus of claim 1 in which the heating means defines separate heating elements individual to each channel for maintaining each channel at a predetermined temperature.

5. The apparatus according to claim 2 wherein at least two of said channels communicates with a shooting pot for sequential injection.

6. The apparatus according to claim 1 wherein the hot runner system includes a plurality of manifold segments, a first manifold segment incorporating a first channel, a second manifold segment incorporating a second channel, and a third manifold segment incorporating a third channel.

7. The apparatus according to claim 6 including heating means associated with said manifold segments for maintaining said first, second and third channels at different temperatures.

8. A tri-injection molding apparatus for molding articles and preforms having multi-layered walls comprising:
   at least one mold cavity, said cavity having a nozzle individual thereto,
   a hot runner system including conduit means for supplying at least three thermoplastic materials to said nozzle, each material originating from a separate source, in which the conduit means defines separate and individual channels for each thermoplastic material, wherein at least one of said channels communicates with a shooting pot in which said at least one channel includes a spool valve for controlling flow to said shooting pot, heating means associated with the apparatus for maintaining at least two of said materials at their appropriate temperature from its source through the hot runner system and through the nozzle to the mating mold cavity, and heating means associated with the apparatus for maintaining at least one of said materials at the appropriate process temperature from its source through the hot runner system to the nozzle

* * * * *